April 24, 1951 L. M. POTTS 2,550,427

MAGNETIC RECORDING AND TRANSMITTING SYSTEM

Filed June 11, 1947 2 Sheets-Sheet 1

INVENTOR
LOUIS M. POTTS, DECEASED
MARTHA W. C. POTTS, EXECUTRIX
BY Emery Robinson
ATTORNEY

MAGNETIC RECORDING AND TRANSMITTING SYSTEM

Filed June 11, 1947 2 Sheets-Sheet 2

INVENTOR
LOUIS M. POTTS, DECEASED
MARTHA W. C. POTTS, EXECUTRIX
BY Emery Robinson
ATTORNEY Patented Apr. 24, 1951 2,550,427

UNITED STATES PATENT OFFICE 2,550,427

MAGNETIC RECORDING AND TRANSMITTING SYSTEM

Louis M. Potts, deceased, late of Evanston, Ill., by Martha W. C. Potts, executrix, Evanston, Ill., assignor to Teletype Corporation, Chicago, Ill., a corporation of Delaware Application June 11, 1947, Serial No. 754,032

4 Claims. (Cl. 178—17)

The present invention pertains to magnetic recording and transmission and more specifically to the recording and retransmission of start-stop signals such as are utilized in the telegraph field.

Prior magnetic recording devices usually have consisted of a wire which is moved continuously through a magnetic field for the recording of audible sounds, and the retransmission thereof by moving the wire, also continuously, through a transmitting magnet.

In some instances the recording magnetically of code signals has been disclosed, but in these instances the magnetized medium is moved continuously through the recording and/or retransmitting magnet fields. Also, in these instances start-stop code signals have not been utilized, but instead telegraph code signals of a multiplex type have been utilized.

Accordingly, a primary object of the present invention is to provide apparatus for the magnetic recording and retransmission of start-stop telegraph code signals.

Another object of the present invention is to provide magnetic recording apparatus wherein the medium to be magnetized is advanced intermittently.

In general the recording apparatus comprises a recording magnet controlled through a line relay for magnetizing a medium passing its core and means to advance the medium intermittently in accordance with start-stop code signals. A second embodiment of such a device provides for the recording magnet to be operated for an interval of short duration at the signal midpoint.

Retransmission apparatus is also provided which comprises a transmitting magnet energized in accordance with the magnetized medium passing through a gap in its core, means to advance continuously the magnetized medium, and a circuit responsive to the operation of the magnet for transmitting start-stop code signals. A second embodiment of a transmitter provides slightly different mechanical apparatus operating on the same general principles and includes the generation of start and stop impulses irrespective of the medium.

A more complete understanding may be had of the present invention by the following detailed description, when read in conjunction with the accompanying drawings, in which.

Prior to a description of the apparatus it is believed pertinent to include a few remarks about the start-stop code utilized in telegraphy. Such code is formed of signals, each of which comprise a stop interval, a start interval, and five or more code impulse intervals. The start and stop intervals are of opposite polarity, or of battery and no battery, so that receiving apparatus may be held unoperative during the stop interval and be released for operation during the start interval by a change of the electrical condition of the signaling line or channel. The code impulse intervals comprise different electrical conditions, in varying permutations, in order to form the desired code selection. It might also be noted that usually the stop interval or impulse consists of "marking" or battery on the line whereas the start interval or impulse consists of "spacing" or no battery on the line.

Figures 1, 2, 3, 4, 5, 6:
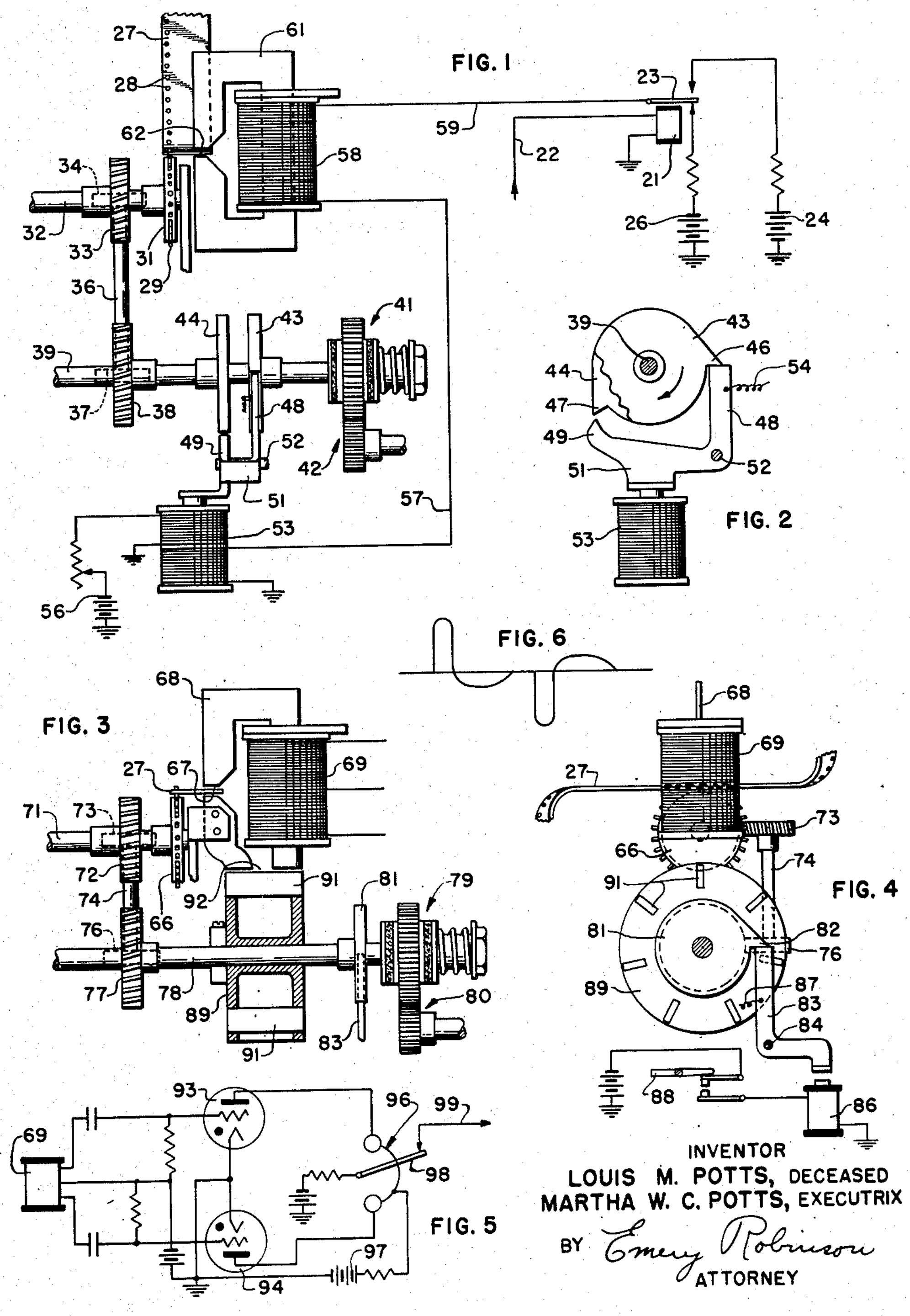
Fig. 1 is a diagrammatic drawing of the mechanical and electrical elements utilized in one form of the magnetic recording apparatus.
Fig. 2 is a detail view in a different plane of certain of the elements shown in Fig. 1.
Fig. 3 is an elevational view showing the mechanical elements forming one form of magnetic retransmission apparatus.
Fig. 4 is a side view of the apparatus shown in Fig. 3.
Fig. 5 is an electrical circuit utilized with the apparatus shown in Figs. 3 and 4.
Fig. 6 is a showing of the form of the impulses generated from the magnetized medium.

Referring now to the apparatus shown in Figs. 1 and 2 comprising a magnetic recorder, a line relay 21 is responsive to code signals received over a line or signaling channel 22, the relay 21 releasing or attracting its armature 23 depending on whether a spacing or marking impulse, respectively, is received. The armature 23 when released engages an upper contact point for completing an electrical circuit to negative grounded battery 24 over an obvious circuit, and when attracted engages a lower contact point for completing an electrical circuit to positive grounded battery 26, also over an obvious circuit.

A recording medium 27 is provided which may be a relatively narrow magnetizable tape of any suitable material. The tape 27 is provided with feed holes 28 near the left-hand margin which coact with sprocket feed pins 29 on a rotatable sprocket feed wheel 31. The sprocket 31 is mounted securely to a stub shaft 32 which is also provided with a gear 33 fastened thereto. The gear 33 is driven by a driving gear 34 which is secured to a shaft 36, the opposite extremity of which is provided with a gear 37. The gear 37, in turn, meshes with a gear 38 which is fastened securely to a shaft 39 which may be rotated through a slip clutch indicated generally by the numeral 41 from a continuously operating source, such as a motor shaft, not shown, through a gear train indicated generally by the numeral 42.

Fastened securely to the shaft 39 are a pair of cams 43 and 44 for control purposes, as will be described hereinafter, each of which is provided with a lug 46 and 47, respectively, Fig. 2. An arm 48 is associated with the cam 43 and an arm 49 is associated with the cam 44, both arms being formed integrally with a lever 51 mounted pivotally on a shaft 52 and serving as an armature for a magnet 53. The arm 48 is urged in a clockwise direction, Fig. 2, by a spring 54.

The magnet 53 is provided with an upper winding which is part of an electrical circuit traceable from positive grounded battery 56, over an obvious circuit, and through the upper winding to ground. The magnet 53 also has a lower winding which is a portion of an electrical circuit which may be traced from ground, through the lower winding, over a conductor 57, through the winding of a recording magnet 58 and over a conductor 59 to the armature 23. The magnet 58 is provided with a core 61 having a gap 62 therein, through which the tape 27 is fed.

In the following description of the operation of the apparatus an assumption will be made that the various elements are initially as they are shown in Figs. 1 and 2. Under this condition a battery or marking condition is on the line 22, which results in the relay 21 being held energized with its armature 23 attracted thereto. At this time an electrical circuit is established which may be traced from positive grounded battery 26, over the conductor 59, through the winding of the recording magnet 58, over the conductor 57 and through the lower winding of the magnet 53 to ground.

The positive battery through the lower winding of the magnet 53 augments the positive battery 56 in the upper winding and holds the armature lever 51 in an attracted position, as illustrated in Fig. 2, with the arm 48 blocking the lug 46 on the cam 43 and preventing rotary movement of the cam. Inasmuch as the cam 43 is fastened securely to the shaft 39 no rotary power will be supplied from the continuously operating source but instead the clutch 41 will slip. At this time then, no rotary movement will be transmitted through the shaft 36 and the gears 33 and 34 to the feed wheel 31, thereby holding the tape 27 in a stationary condition.

Also under this initially described condition it was mentioned that positive battery from source 26 passed through the winding of the magnet 58. This results in a magnetic flux being induced in the magnet core 61, in a clockwise direction, for example, which causes the tape 27 to be magnetized at the point where it passes through the core gap 62, in a direction of north at the top and south at the bottom, for example.

As soon as a start impulse is received over the line 22, indicating a distant transmitter, which may be tape or keyboard operated, has a message to be recorded magnetically, the relay 21 will deenergize and its armature 23 be released as the start impulse is a no battery condition. At this time the circuit from positive battery 26 will be broken, but a circuit established from negative battery 24 over the previously described circuit and through the winding of the magnet 58 and the lower winding of the magnet 53. Because of the reversal of current through the winding of the magnet 58 the induced current will take an opposite direction through the core 61, thereby causing the tape 27 to be magnetized at the point of the gap 62 in a direction of south at the top and north at the bottom, for instance.

The negative battery passing through the lower winding of the magnet 53 opposes and thus neutralizes the effect of the positive battery passing through the upper winding from the source 56, and thereby causes the magnet to de-energize, resulting in the spring 54 urging the arm 48 in a clockwise direction, Fig. 2, thereby no longer engaging the lug 46, but allowing the cam 43 to rotate in a clockwise direction through the clutch 41 and the shaft 39. The shafts 36 and 32 will likewise rotate because of the geared connections, thus imparting rotation to the sprocket feed wheel 31 to advance the magnetizable medium or tape 27.

The tape 27 will be advanced a distance sufficient for the start and five or more code impulses to be recorded thereon inasmuch as the lug 46 once released will allow the cam 43 to make one complete revolution. During the rotation of the cam 43 and the tape feed, the relay 21 will be operated successively by the five code impulses in varying permutations causing its armature 23 to be placed in engagement with its upper or lower contact points. The result of the latter is that the tape 27 will be magnetized in one of the two conditions described for the stop and start impulse conditions in accordance with the marking or spacing characteristics of the received signals.

The movement of the armature 23 and the positive or negative battery circuits will have no effect on the cam 43, as once the lug 46 is released the cam 43 will be allowed to make one complete revolution irrespective of the varying conditions in the magnet 53.

Just before the cam 43 reaches its position for receipt of a stop signal the lug 47 on the cam 44 will engage the arm 49 and cam it in a counterclockwise direction, thereby pivoting the lever 51 in a counterclockwise direction and placing the arm 48 in position to engage the lug 46, thereby shortly afterward stopping rotation of the cam 43 and of the feed wheel 31 and thus arresting the forward motion of the tape 27. The stop impulse will have been received over the line 22, causing the magnet 53 to be energized to hold lever 51 operated as positioned, holding cam 43 against further movement, in the condition described initially.

The above cycles will be repeated until no further code signals are being transmitted over the line 22, at which time the apparatus will assume a condition as described initially with marking on the line.

It is obvious that the apparatus will operate satisfactorily under other conditions, such as reverse polarity for marking and spacing, and a greater or less number of impulses in each code signal.

A transmitter for use with the tape prepared by the above described apparatus is illustrated mechanically in Figs. 3 and 4. By referring to these figures it may be seen that a sprocket feed wheel 66 is provided for advancing the tape 27 through a gap 67 formed in the core 68 of a reproducing magnet 69. The sprocket wheel 66 is advanced continuously, deriving its rotation from shaft 71 to which it is fastened securely, gear 72 also fastened to the shaft 71, meshing gear 73, shaft 74, gear 76 fastened to shaft 74, meshing gear 77, and continuously rotating shaft 78 which derives its motion from some suitable source, such as a motor shaft, not shown, through a friction clutch indicated generally as 79, and a gear train 80. The rotation of shaft 78 is controlled by a stop cam 81 provided with a lug 82, Fig. 4, which coacts with a stop arm 83 which is mounted pivotally as at 84 and forms the armature of a magnet 86. The apparatus when in an unoperated condition is such that the magnet 86 will be de-energized, thereby allowing a spring 87 to urge the stop arm 83 in a counterclockwise direction with its extremity engaging the lug 82 and preventing rotation of the shaft 78. At such time as it is desired to operate the apparatus a switch 88 may be operated to cause the establishment of an obvious circuit for the energization of the magnet 86, thereby biasing the stop arm 83 from engagement with the lug 82 and permitting rotation to be imparted to the shaft 78 through the friction clutch 79. The magnet 86 should be retained energized as long as it is desired to transmit.

Also fastened securely to the shaft 78 is a drum 89 constructed of a nonmagnetic material such as copper and formed with seven soft iron or similar magnetic conducting inserts 91 at intervals in the periphery thereof. The drum 89 is so positioned that as it rotates the inserts 91 are in close proximity to a second gap 92 in the core 68, and serve to close the gap.

The magnet 69 is provided with three leads from its winding, as may be seen in Fig. 5, the outer ones of which are connected through condensers to the grids of gas tubes 93 and 94. The center lead is balanced with respect to the winding and is grounded through a negative battery, there being conductor branch-offs which lead through resistors to the grid leads, thus biasing the grids slightly negative. The cathodes of the tubes 93 and 94 are connected to ground. The anodes of the tubes are connected to separate windings of a polar relay 96, which are also connected to a battery 97. An armature 98 of the polar relay 96 is connected to grounded positive battery over an obvious circuit and when in one operated position makes contact with a signaling line or channel 99 over which transmission may be made to a distant station.

In the following description of the operation of the transmitter it will be assumed that the switch 88 has been operated, thus energizing the magnet 86 and releasing the shaft 78 for rotation and also that a tape 27 had been previously inserted in position to be advanced by the sprocket wheel 66. It might be noted that the feed holes 28 in the tape 27 should be so spaced that one will be adjacent the start of a code signal (start impulse) in order to insure proper threading of the tape in the transmitter.

In the following description it should also be assumed that the gearing, provided by the meshing gears 72 and 73 and meshing gears 76 and 77 is such that the drum 89 will make one complete revolution while the tape 27 is advanced a distance equal to the sum of the impulse intervals comprising a single code signal. Also, it should be assumed that the timing is such that an iron insert 91 will be in position in the gap 92 in the core 68 at the time that the approximate midpoint of a magnetized code impulse interval on the tape 27 is presented in the gap 67 in the core 68. It should also be remembered that each code signal magnetized in the tape 27 comprises a start impulse, five code impulses, and a stop impulse.

In operation, as the tape 27 is fed through the gap 67 in the core 68, a start impulse will be presented to the core 68 and simultaneously one of the soft iron inserts 91 will be adjacent the gap 92. Such will result in the reluctance of the magnetic circuit being reduced suddenly, greatly increasing the flux in the circuit and inducing impulses such as are illustrated in Fig. 6 in the winding of the magnet 69, thereby raising the grid potential of one of the tubes 93 or 94 to firing potential. The impulse will be of one of the two polarities shown in Fig. 6 depending on whether the tape 27 is magnetized for a marking or spacing impulse. Likewise, the tube 93 or 94 which is rendered conductive is dependent on whether the impulse is marking or spacing.

If it is assumed that the start impulse causes the tube 94 to be rendered conducting the polar relay 96 will be biased so as to move its armature 98 to its lower position thereby removing battery from the line 99. This is consistent with standard practice where marking on the line is used for the stop impulses. The tube 93, if conducting previously, will be extinguished upon tube 94 conducting through the commutating effect of the two windings of the polar relay 96 in the anode circuits of the tubes, in a manner well known to the art.

As the tape 27 is advanced with the five impulse intervals being advanced successively through the gap 67 the soft iron inserts 91 will be simultaneously positioned adjacent the gap 92, thereby causing impulses to be induced in the magnet winding in accordance with the marking or spacing characteristic of the code impulse, the tubes 93 and 94 and the polar relay 96 being operated in accordance therewith, as described above. As the stop impulse interval is reached the tube 93 will be rendered conducting, if not already so, the polar relay 96 will be biased to position its armature 98 to its upper position, and battery will be connected to the line 99.

The just described operation will continue in a similar manner for the transmission of all the code signals stored in the tape 27. After all the message code signals are transmitted the apparatus will be as described for the transmission of the stop impulses, as above, thereby assuring a condition of marking on the line when no signals are being transmitted, as is done in standard telegraph practice.

Figures 7, 8:
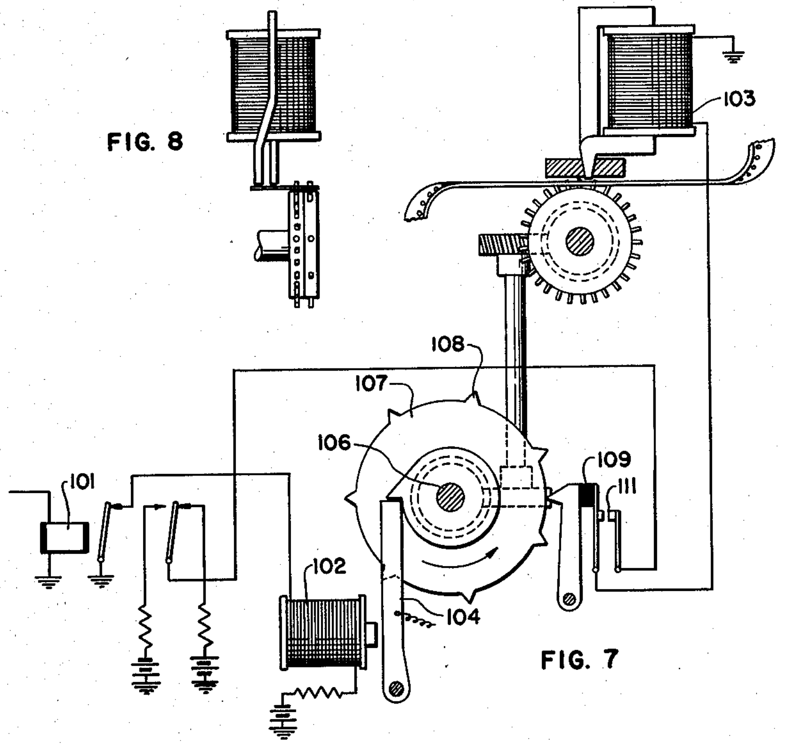
Fig. 7 is a diagrammatic view of the mechanical and electrical elements utilized in a second embodiment of magnetic recording apparatus.
Fig. 8 is a detail view of a portion only of the elements shown in Fig. 7.

The second embodiment of a recorder, shown in Figs. 7 and 8, is substantially similar to that described originally. Because of such similarity the following description will be detailed only for features which are different from the previous description.

With reference to Fig. 7, a line relay 101 follows the incoming signals, its two armatures controlling a release magnet 102 and a recording magnet 103. A start impulse on the signal line to the relay 101 causes the magnet 102 to be energized, attracting its armature 104 and releasing the shaft 106 for operation.

That shaft 106 is provided with a cam 107 which is formed with seven lugs 108 spaced on the periphery thereof, all of which control a follower 109 which forms one contact of a contact pair 111. Thus, as each lug 108 engages the follower 109 the contact pair 111 will be closed momentarily. Inasmuch as the contact pair 111 is in series in the electrical circuit from one of the armatures of the relay 101 to the recording magnet 103, the magnet will only record during the interval the contact pair 111 is closed, even though the armature is positioned in accordance with the marking or spacing characteristic of the received signal for a longer period of time. The lugs 108 have been so positioned that the contact pair 111 will be closed at the approximate midpoint of each received code signal impulse, including the start and stop impulses. In this manner, the magnetization of the tape may be sharp and not over too long a portion.

The tape feed sprocket has been widened and formed with two sets of sprocket feed pins, the tape also being formed with two sets of feed holes, in adjacent longitudinal rows. As may be seen in Fig. 8, the one set of pins have individual pins spaced a distance apart, the distance between adjacent pins being the distance necessary on which to record a complete code signal. In this manner, by inserting the tape in the feed apparatus with pins in each row adjacent the gap in the core, it is possible to space signals between adjacent pins in the row having the pins spaced a distance apart and thus provide a starting point for insertion of the tape in retransmission apparatus.

Figure 10:
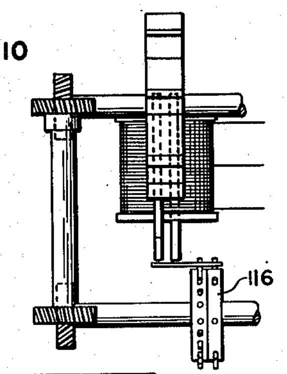
Fig. 10 is a side view of the apparatus shown in Fig. 9.
Figure 9:
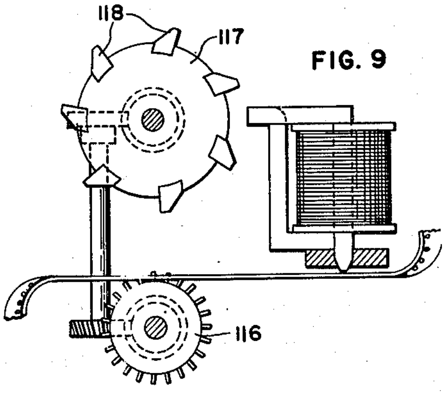
Fig. 9 is an elevational view of the mechanical elements forming a second embodiment of magnetic retransmission apparatus.
Figure 11:
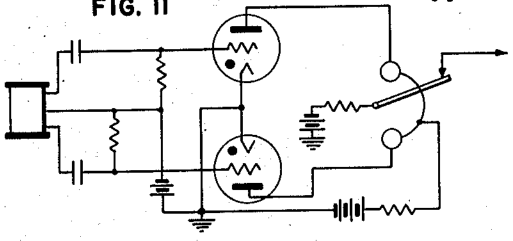
Fig. 11 is an electrical circuit utilized with the apparatus shown in Figs. 9 and 10.

A transmitting apparatus which may be used with tape 27 prepared by the apparatus shown in Figs. 7 and 8, is illustrated mechanically in Figs. 9 and 10. In this apparatus the elements are similar substantially to those illustrated in Figs. 3 and 4, except that a sprocket feed wheel 116 is provided which is formed with two sets of feed pins to accommodate the tape described above as utilized in Figs. 7 and 8.

The present device also is provided with a member 117 of nonmagnetic material provided with soft iron or similar magnetic conducting inserts 118.

In the event that it is so desired the soft iron inserts 118 utilized for the stop and start impulses may be in the form of permanent magnets, of opposite polarity, each corresponding to the correct polarity characteristic for the marking and spacing impulse utilized. In this manner it is possible to either augment the normal start and stop impulses magnetized in the tape or to insert locally start and stop impulses in the event that only five code signal impulses are stored in the magnetizable medium.

It should also be noted that the apparatus illustrated in Figs. 7 to 10, inclusive, utilizes a tape in which the north, south, or south, north magnetizations appear side by side rather than at the top and bottom of the tape, all as described initially.

While specific embodiments of the invention have been illustrated and described it is to be understood that they are illustrative only, and that various modifications may be made therein without departing from the scope and spirit of this invention.

What is claimed is:

1. In magnetic recording apparatus, a source of code signals, means conditioned by each component of said code signals, a recording magnet, a medium to be magnetized, means to advance said medium past said magnet to be magnetized in accordance with said code signals, and means for completing an energizing circuit from said conditioned means to said recording magnet at predetermined intervals with respect to the duration of each component of said code signals and in accordance with the characteristic of each such component.

2. In magnetic recording apparatus, a source of code signals, a relay under the control of said code signals, a recording magnet, a circuit conditioned by said relay for energizing said magnet in accordance with the characteristic of said code signals, a contact pair in series with said conditioned circuit, and means to close said contact pair at predetermined intervals with respect to said code signals to energize said recording magnet.

3. In magnetic recording apparatus, a source of code signals each composed of a start, a stop, and a plurality of signal impulses, a medium to be magnetized in accordance with the characteristic of said signal impulses, a recording magnet, means for advancing said medium past said recording magnet, means for releasing said advancing means in response to the receipt of a start impulse, and timing means released simultaneously with said advancing means for causing said recording magnet to be operated in accordance with the impulse characteristic momentarily and at predetermined intervals with respect to the receipt of said impulses.

4. In magnetic recording apparatus, a source of code signals each composed of a start, a stop, and a plurality of signal impulses, a medium to be magnetized in accordance with the characteristics of said signal impulses, a recording magnet, means for advancing said medium past said recording magnet, means for releasing said advancing means in response to the receipt of a start impulse, timing means released simultaneously with said advancing means for causing said recording magnet to be operated in accordance with the impulse characteristic momentarily and at predetermined intervals with respect to the receipt of said impulses, and means for arresting advancement of said medium during the stop impulse interval under the control of the stop impulse.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,813,908 | Bethenod | July 14, 1931 |
| 1,848,799 | Papalia | Mar. 8, 1932 |
| 1,947,249 | Bush | Feb. 13, 1934 |
| 2,131,322 | Higgitt et al. | Sept. 27, 1938 |
| 2,300,463 | Palme | Nov. 3, 1942 |
| 2,382,251 | Parker et al. | Aug. 14, 1945 |
| 2,403,009 | McCann | July 2, 1946 |
| 2,431,646 | Kenney et al. | Nov. 25, 1947 |